US012299212B2

(12) United States Patent
Ricci et al.

(10) Patent No.: US 12,299,212 B2
(45) Date of Patent: May 13, 2025

(54) DEVICE FOR CONTROLLING A CURSOR OF A GRAPHICAL USER INTERFACE OF A FLIGHT UNIT

(71) Applicant: LEONARDO S.P.A., Rome (IT)

(72) Inventors: Francesco Ricci, Pomezia (IT); Giovanni Barile, Pomezia (IT); Massimo Fabbrini, Pomezia (IT)

(73) Assignee: LEONARDO S.P.A., Rome (IT)

( * ) Notice: Subject to any disclaimer, the term of this patent is extended or adjusted under 35 U.S.C. 154(b) by 0 days.

(21) Appl. No.: 18/558,598

(22) PCT Filed: May 10, 2022

(86) PCT No.: PCT/IB2022/054307
§ 371 (c)(1),
(2) Date: Nov. 2, 2023

(87) PCT Pub. No.: WO2022/238877
PCT Pub. Date: Nov. 17, 2022

(65) Prior Publication Data
US 2024/0241589 A1   Jul. 18, 2024

(30) Foreign Application Priority Data

May 10, 2021 (EP) .................................... 21425022
Mar. 31, 2022 (IT) ....................... 102022000006404

(51) Int. Cl.
*G06F 3/033* (2013.01)
*B64D 43/00* (2006.01)
(Continued)

(52) U.S. Cl.
CPC ........... *G06F 3/0338* (2013.01); *B64D 43/00* (2013.01); *G06F 3/0202* (2013.01); *G06F 3/038* (2013.01)

(58) Field of Classification Search
CPC ............................. G06F 3/0338; G06F 3/0202
See application file for complete search history.

(56) References Cited

U.S. PATENT DOCUMENTS 5,432,530 A    7/1995  Arita et al.
6,262,715 B1 * 7/2001  Sawyer ............... G06F 3/03543
                                                      345/163
(Continued)

OTHER PUBLICATIONS

International Preliminary Report on Patentability for International Application No. PCT/IB2022/054307 mailed Jul. 28, 2023.
(Continued)

*Primary Examiner* — Liliana Cerullo
(74) *Attorney, Agent, or Firm* — Dorsey & Whitney LLP

(57) ABSTRACT

Device for controlling a cursor of a graphical user interface of a flight unit, comprising a base structure; a graspable body shaped to be grasped by a hand of an operator and movable with respect to the base structure by the manual force provided by the operator by means of his/her hand; a force sensor coupled to the graspable body and designed to sense the movements of the graspable body with respect to the base structure along at least a first axis and a second axis; an interface circuit for converting the signals provided by the force sensor into control signal of the graphical user interface of the flight unit in order to move the cursor along a first axis and a second axis of the graphical user interface based on the force provided to the graspable body by the operator.

10 Claims, 3 Drawing Sheets

(51) Int. Cl.
    *G06F 3/02*         (2006.01)
    *G06F 3/0338*     (2013.01)
    *G06F 3/038*      (2013.01)

(56)             References Cited

U.S. PATENT DOCUMENTS

| | | | |
|---|---|---|---|
| 10,591,948 | B1 | 3/2020 | Culp et al. |
| 2001/0040553 | A1 | 11/2001 | Rosenberg |
| 2003/0011503 | A1* | 1/2003 | Levenson ............ G06F 3/0219 341/200 |
| 2008/0129687 | A1* | 6/2008 | McAuliffe ............ G06F 3/0346 345/156 |
| 2009/0314116 | A1* | 12/2009 | Bandera .................... F16D 3/10 74/471 XY |
| 2014/0353433 | A1* | 12/2014 | Gemmati ............ B64C 13/0427 244/234 |
| 2014/0353438 | A1* | 12/2014 | Kerdreux ............... B60K 35/10 248/118 |
| 2015/0329199 | A1* | 11/2015 | Golborne ............ B64C 13/0421 244/196 |
| 2017/0031382 | A1 | 2/2017 | Niguet et al. |
| 2020/0019253 | A1* | 1/2020 | Kitagawa ............ G06F 3/04883 |

OTHER PUBLICATIONS

International Search Report and Written Opinion from International Application No. PCT/IB2022/054307 mailed Sep. 8, 2022.
Reply to Second Written Opinion from International Application No. PCT/IB2022/054307 filed Apr. 14, 2023.
Reply to Written Opinion from International Application No. PCT/IB2022/054307 filed Feb. 28, 2023.
Second Written Opinion from International Application No. PCT/IB2022/054307 mailed Mar. 23, 2023.

* cited by examiner

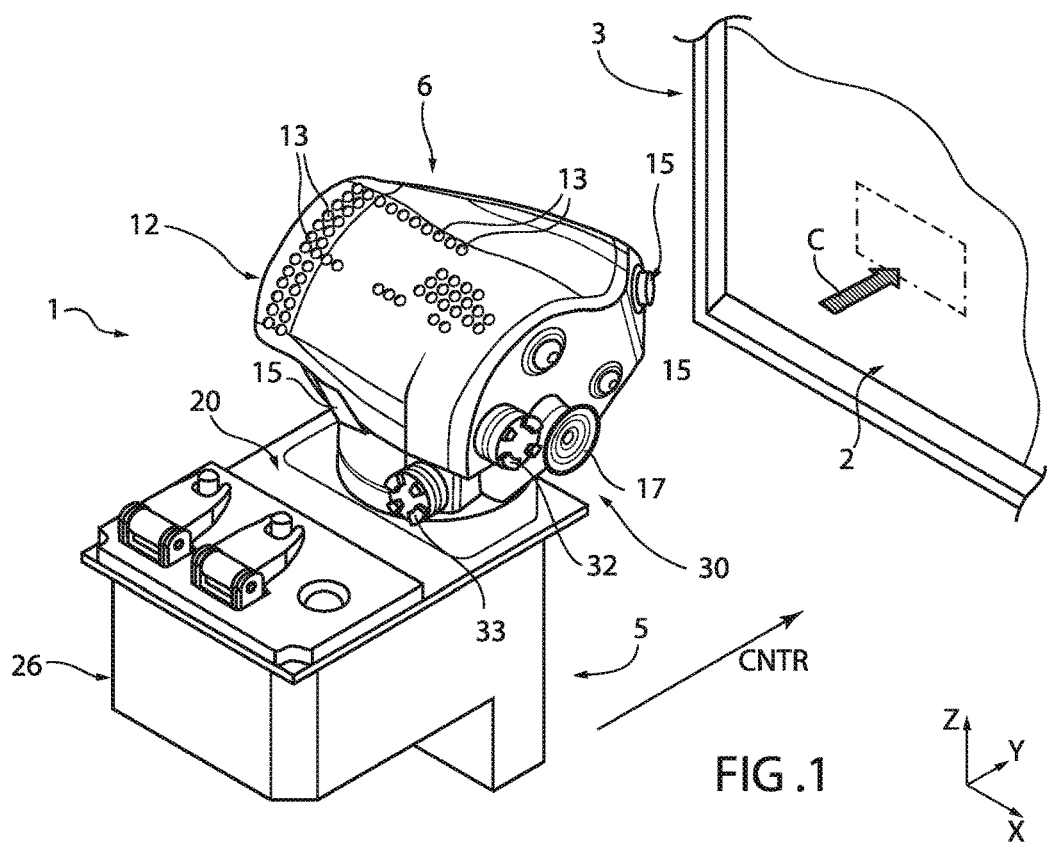
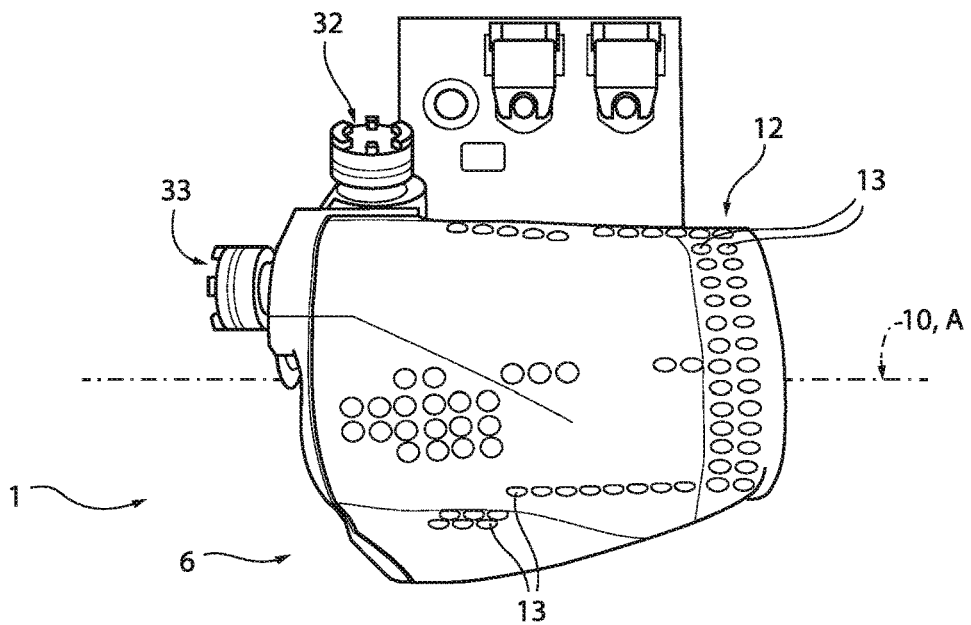

DEVICE FOR CONTROLLING A CURSOR OF A GRAPHICAL USER INTERFACE OF A FLIGHT UNIT

CROSS-REFERENCE TO RELATED APPLICATIONS

This Patent Application is a U.S. national stage of PCT International Application No. PCT/IB2022/054307 filed on May 10, 2022, which claims priority to European Patent Application No. 21425022.7 filed on May 10, 2021 and Italian Patent Application No. 102022000006404 filed on Mar. 31, 2022, the contents of each of which are incorporated herein, in its entirety, by this reference.

TECHNICAL FIELD OF THE INVENTION

The present invention relates to a device for controlling a cursor of a graphical user interface (GUI) of a flight unit.

STATE OF THE ART

The present invention relates to a device for controlling a cursor of a graphical user interface of a flight unit.

Flight units are provided with a great number of graphical user interfaces that are controlled by moving a cursor over a unit screen according to the very well-known techniques used in computer science.

Normally the cursor is moved by acting on a trackball that is operated by the medium or by index finger of an operator (for instance the pilot or the navigator).

Other solutions provide a directional transducer that is moved by the thumb finger.

Flight units operate in harsh environments that are severely affected by vibrations; vibrations are particularly relevant in helicopters and may affect the control of the trackball as the vibrations are transferred to the operator and his/her hand may tremble.

Accurate positioning of the cursor is thus negatively affected by vibrations. Moreover, as a rule, the operator together with the cursor movement has to actuate other control components using the same hand; hence, having some finger occupied with the cursor control, there are limited position solutions for the other controls components.

SUBJECT AND SUMMARY OF THE INVENTION

The scope of the present invention is to provide a device for cursor control of a graphical user interface of a flight unit that is less affected by vibrations and that permits a precise cursor control and, at the same time, a control components control.

BRIEF DESCRIPTION OF THE DRAWINGS

FIG. 1 is a perspective view of a device for controlling a cursor of a graphical user interface of a flight unit according to the present invention;
FIG. 2 is a top view or the device of FIG. 1.

DETAILED DESCRIPTION OF PREFERRED EMBODIMENTS OF THE INVENTION

Figure 3:
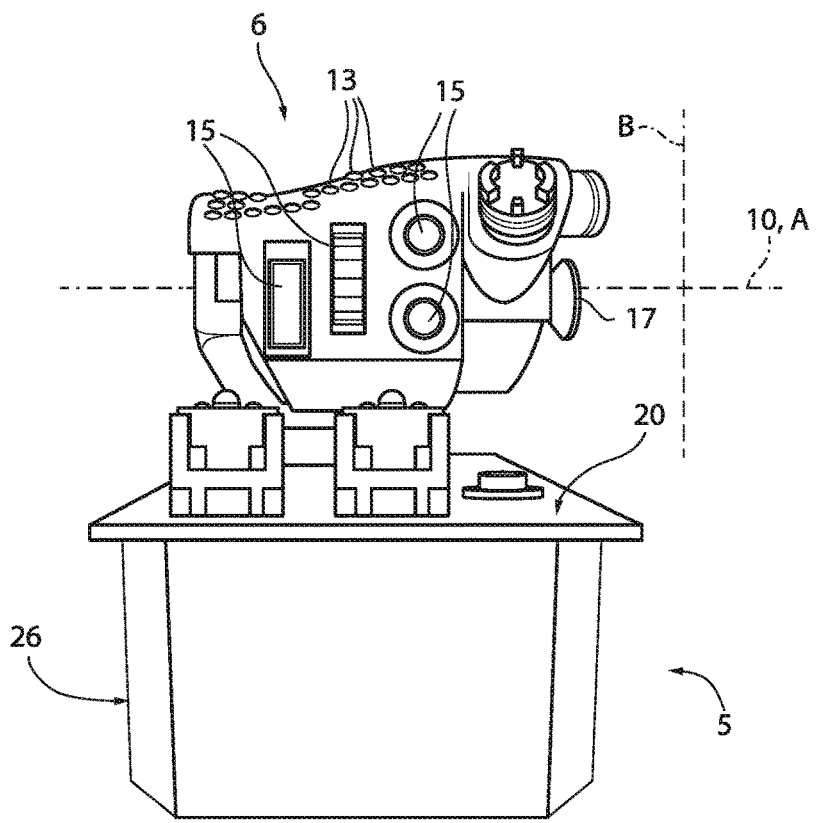
FIG. 3 is a front view or the device of FIG. 1.
Figure 4:
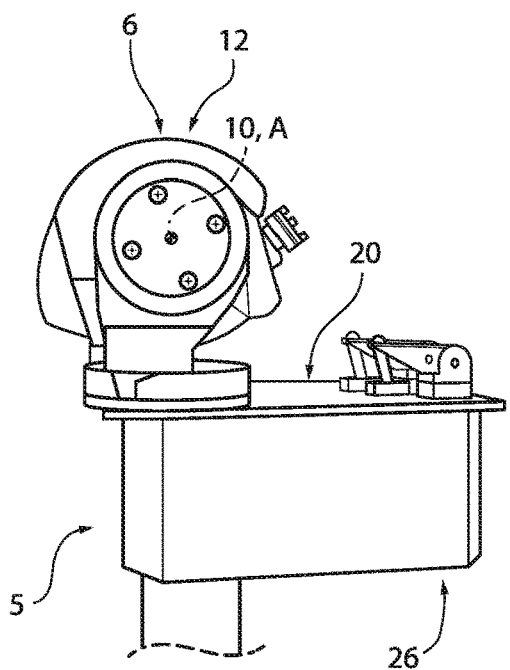
FIG. 4 is a first side view or the device of FIG. 1.
Figure 5:
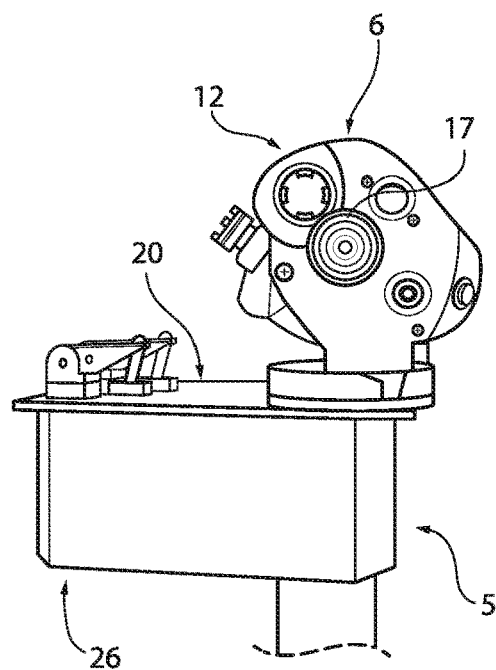
FIG. 5 is a second side view or the device of FIG. 1.

The following description is provided to enable a person skilled in the art to make and use the invention. Various modifications to the embodiments will be readily apparent to those skilled in the art, without departing from the scope of the claimed invention. Thus, the present invention is not intended to be limited to the embodiments shown, but is to be accorded the widest scope consistent with the principles and features disclosed herein and defined in the appended claims.

Unless otherwise defined, all technical and scientific terms used herein have the same meaning as commonly understood by one of ordinary skill in the art to which the embodiments disclosed belongs. In the case of conflict, the present specification, including definitions, will control. In addition, the examples are illustrative only not intended to be limiting.

For the purposes of promoting understanding of the embodiments described herein, reference will be made to certain embodiments and specific language will be used to describe the same. The terminology used herein is for the purpose of describing particular embodiments only, and is not intended to limit the scope of the present disclosure.

In the attached drawings (we refer particularly to FIGS. 1 and 2) reference numeral 1 designates a device for controlling a cursor of a graphical user interface 2 (shown partially and schematically) of a flight unit 3 (FIG. 1) that is preferably installed in the cabin of on an helicopter (not shown).

The cursor control device 1 comprises:
a base structure 5;
a graspable body 6 shaped to be grasped by a hand (not shown) of an operator and movable with respect to the base structure 5 by the manual force provided by the operator by means of his/her hand;
a force sensor 7 (see FIGS. 6 and 7) coupled to the graspable body 6 and designed to sense the movements of the graspable body 6 with respect to the base structure 5 along at least first axis X and a second axis Y (we refer to FIG. 1 where axes are shown);
an interface circuit 8 (FIG. 6) for converting the signals provided by the force sensor 7 into control signal CNTR of the graphical user interface 2 of the flight unit 3 in order to move the cursor C along a first axis and a second axis of the graphical user interface 2 based on the force provided to the graspable body 6 by the operator.

Preferably, the force sensor 7 is configured to convert the applied force into a correspondent voltage. As an example, the force sensor 7 is a piezoelectric sensor.

As shown in FIGS. 1 and 2, the graspable body 6 has an almost truncated conical shape and extends along one axis 10. The graspable body 6 is limited by an external surface 12 provided with a number of relives, projections or bumps 13 (see FIGS. 1, 2 and 3) designed to improve the gripping properties of the graspable body 6.

The graspable body 6 is provided with a number of control components 15 (buttons, levers, knobs, etc., see FIGS. 1 and 3) provided on the external surface 12 of the graspable body 6 and designed to be finger-actuated to provide controls for the flight unit 3 or for other units installed on the helicopter.

The graspable body 6 is provided with a confirming component 17 in a form of a pushing button placed on the front surface of the graspable body 6 and designed to be manually actuated to enable the control signal CNTR to be sent to the graphical user interface 2 of the flight unit 3 in order to move the cursor so that the control of the cursor is possible once said confirming component 17 is manually actuated (in the example is pressed), whereby unwanted manual actuations of the graspable body 6 due to shocks or vibrations applied to the operator are avoided.

More specifically the pushing button 17 is cup shaped and is placed on the front side of the graspable body 6 so that it can be actuated by the index finger of the operator.

As an alternative the confirming component 17 could be placed on the lateral side to be actuated by the thumb finger.

Figure 6:
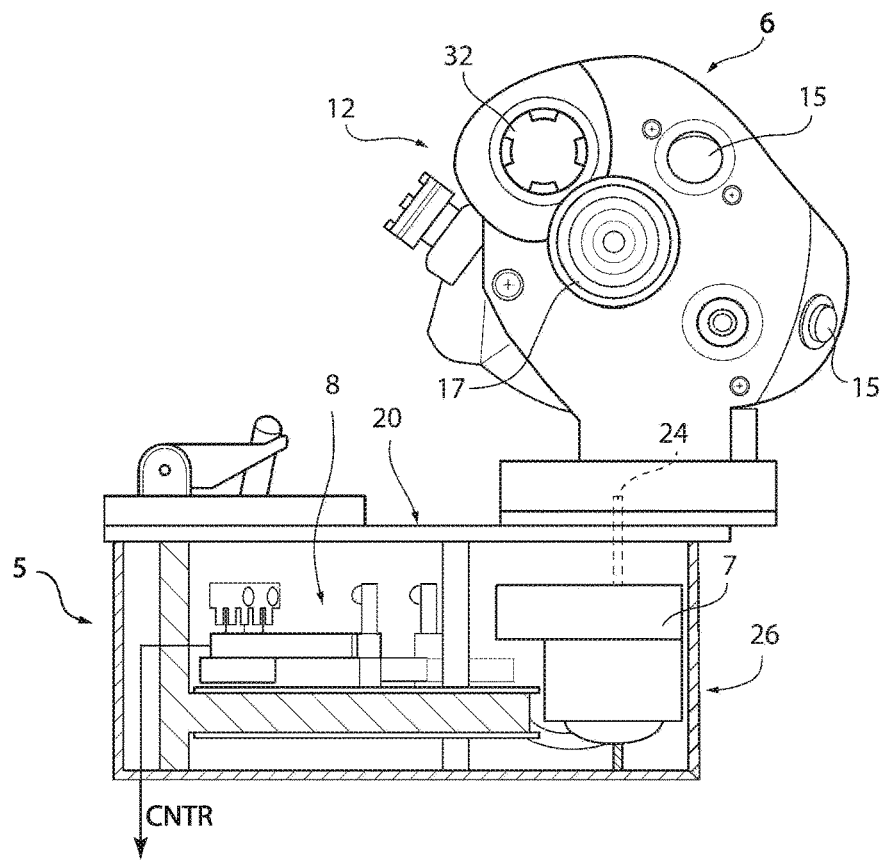
FIG. 6 is a section of the device of FIG. 1.
Figure 7:
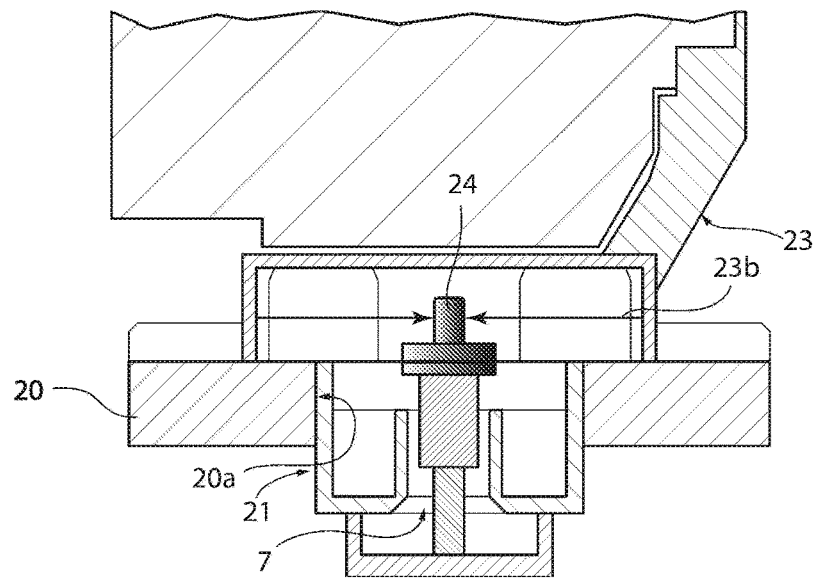
FIG. 7 is a portion of the section of FIG. 6 in an enlarged view.

With reference to FIGS. 6 and 7, the cursor control device 1 comprises a first installation plate 20 carrying in a stable manner a cylindrical protecting body 21 (see FIG. 7) of the force sensor 7 and a transducer interface arm 23 having a base 23b connected (connection is schematically shown by means of an arrow) with a movable portion 24 of the force sensor 7; the graspable body 6 is carried by the interface arm 23.

The installation plate 20 has a circular hole 20-a in which it is inserted and stably connected the protecting body 21. The movable portion 24 protrudes in the direction of the interface arm 23.

A protecting cover 26 (we refer to FIGS. 1, 3, 4 and 5) having parallelepiped shape extends from peripheral rims of the plate 20 that has a rectangular shape. The cover 26 covers and protects the interface circuit 8 and the sensor 7.

An angular position regulation device 30 is interposed between the interface arm 23 and the graspable body 6; the angular position regulating device 30 is designed to allow the positioning of the graspable body 6 with respect to the interface arm 23 around a first regulating axis A (corresponding to axis 10) and around a second regulating axis B perpendicular to the first regulating axis (see FIG. 3) in order to optimize, in use, positioning of operator's hand on the graspable body 6.

More specifically, the angular position regulation device 30 are designed to allow angular movement in a step manner around the respective first and second regulating axis A, B, for instance steps of 10° or 20°.

More specifically, in order to avoid unwanted and unnecessary movement of the graspable body around the first and second axis A, B, first and second enabling-disabling components 32, 33 (in a form of a knobs) are provided on the graspable body 6; the first enabling knob 32 has a disk shape and four axial protrusion perpendicular one with respect to the other and is angularly movable between a closed position for disabling the angular movement of the graspable body 6 around the first axis A and an enabling position for permitting the rotation of the graspable body around the first axis A.

The second enabling knob 33 has also a disk shape and four axial protrusions and is angularly movable between a closed position for disabling the angular movement of the graspable body 6 around the second axis and an enabling position for permitting the rotation of the graspable body around the second axis B.

As above described the force transducer 7 is integrated in the installation plate 20 and force is applied acting on the graspable body 6. In this way, instead of using a pointing device actuated by the thumb finger, it is possible to provide cursor movement information acting on the graspable body 6. This action on the graspable body 6 by the arm movement permits to have a more stable and accurate control of the cursor (especially in a high vibrating environment, such as in a helicopter cockpit).

The graspable body 6 also constitutes an element where the pilot hand can stay in easy rest position also in high vibrating environment, and this permits to move the hand and the arm very accurately reporting such accuracy in the cursor movement accuracy.

Managing the cursor movement by the hand, all the fingers are free to operate other control components at the same time of the cursor movement actuation; this permits a better ergonomic distribution of all the required control components on the grip body.

It is again noted that, in order to avoid unwanted actuations due to shocks or vibrations, the central transductor can be activated only with the contemporary pushing of a confirming button 15.

The shape and the number of additional functions integrated in the gripping body is also not limited to the ones described.

The main advantages of the invention are therefore the following:

a. a precise cursor control even in presence of strong vibrations;
c. more than one components are integrated in the graspable body 6;
b. better ergonomic positioning of the control components;
c. easier actuation of the control components by the operator;
d. more functions can be controlled at the same time.

The invention claimed is:

1. A device for controlling a cursor of a graphical user interface of a flight unit that is installed in the cabin of a helicopter, the device comprising:
a base structure;
a graspable body shaped to be grasped by a hand of an operator and movable with respect to the base structure by a manual force provided by the operator by his/her hand;
a force sensor coupled to the graspable body and designed to sense movements of the graspable body with respect to the base structure along at least a first axis and a second axis; and
an interface circuit designed to convert signals provided by the force sensor into a control signal of the graphical user interface of the flight unit in order to move the cursor along a first axis and a second axis of the graphical user interface based on the force provided to the graspable body by the operator; wherein the graspable body is provided with a number of control components provided on the external surface of the graspable body and designed to be finger-actuated to provide control for the flight unit or for other units,
wherein the graspable body has a truncated-conical shape and extends along one axis; wherein the graspable body is limited by an external surface provided with a number of protrusions, projections or bumps designed to improve the gripping properties of the graspable body;
wherein the graspable body is configured to constitute an element that enables a pilot hand to stay in a rest position also in a vibrating environment;
wherein the graspable body is provided with at least one confirming component placed on the external surface of the graspable body having truncated-conical shape and designed to be manually actuated to enable the control signal to be sent to the graphical user interface of the flight unit in order to move the cursor so that the control of the cursor is possible once the at least one confirming component is manually actuated.

2. The device of claim 1, wherein the at least one confirming component is placed on a front side of the graspable body so that the at least one confirming component can be actuated by the operator's index finger.

3. The device of claim 1, wherein the at least one confirming component is placed on a lateral side to be actuated by a thumb finger.

4. The device of claim 1, further comprising a first installation plate carrying in the force sensor and a transducer interface arm connected with a movable portion of the force sensor; the graspable body being carried by the interface arm.

5. The device of claim 4, wherein angular position regulation means are interposed between the interface body and the graspable body; the angular position regulating means being designed to allow the positioning of the graspable body with respect to the interface body around a first regulating axis and around a second regulating axis transversal to the first regulating axis.

6. The device of claim 5, wherein the angular position regulating means are designed to allow angular movement in a step manner of 10° or 20° around the respective first and second regulating axis.

7. The device of claim 6, wherein first and second enabling
disabling components are provided on the graspable body; the first enabling component being movable between a closed position for disabling the angular movement of the graspable body around the first axis and an enabling position for permitting the rotation of the graspable body around the first axis; the second enabling component being movable between a closed position for disabling the angular movement of the graspable body around the second axis and an enabling position for permitting the rotation of the graspable body around the second axis.

8. The device of claim 1, wherein the force sensor is configured to convert the applied force into a correspondent voltage.

9. The device of claim 8, wherein the force sensor includes a piezoelectric sensor.

10. A flight unit of a helicopter having a device for controlling a cursor of a graphical user interface movable along a first axis and a second axis to select functions of the graphical user interface under the manual control of the device as claimed in claim 1.

* * * * *